United States Patent [19]

Lebost

[11] 4,057,270
[45] Nov. 8, 1977

[54] FLUID TURBINE

[76] Inventor: Barry Alan Lebost, 3224 Grand Concourse, Bronx, N.Y. 10468

[21] Appl. No.: 565,025

[22] Filed: Apr. 3, 1975

[51] Int. Cl.$^2$ .............................................. F03D 1/02
[52] U.S. Cl. ..................................... 290/54; 290/42; 290/44; 290/53; 290/55
[58] Field of Search ....................... 290/42, 43, 44, 53, 290/54, 55

[56] References Cited

U.S. PATENT DOCUMENTS

| | | | |
|---|---|---|---|
| 1,504,085 | 8/1924 | Birrell | 290/44 |
| 1,677,745 | 7/1928 | Bonneto | 290/55 |
| 1,936,233 | 11/1933 | Groves | 290/55 |
| 3,513,326 | 5/1970 | Potts | 290/55 |
| 3,697,765 | 10/1972 | Carini | 290/55 |
| 3,720,840 | 3/1973 | Gregg | 290/44 |
| 3,740,565 | 6/1973 | Wesley | 290/55 |

*Primary Examiner*—Robert S. Macon
*Attorney, Agent, or Firm*—Allen D. Brufsky

[57] ABSTRACT

A turbine for generating electric power when exposed to a fluid source, such as a liquid or gaseous current. The turbine has two substantially annular rotor housings spaced in parallel, horizontal planes. Each housing is provided with a plurality of radially extending blades which are connected to coaxial shafts. One of the shafts is connected to the field windings of an electric generator while the other shaft is connected to the armature windings. The radial blades in each rotor housing when exposed to the liquid or gaseous current rotate in opposite directions causing the field and armature windings of the generator to rotate in opposite directions to increase the power output of the generator. Fluid scoops are located at the entrance to each housing to accelerate the fluid current and deliver it to curved stator blades which form a series of fluid jets which further accelerate the incoming fluid and bend the fluid so as to direct it to impinge on the radial rotor blades in a direction providing increased starting torque while also increasing the effective force of the fluid. This increased effective force is added to the internal force of the fluid once operation is commenced so that the scoops and stator blades insure power output in light fluid currents and multiply power output in heavy currents.

45 Claims, 4 Drawing Figures

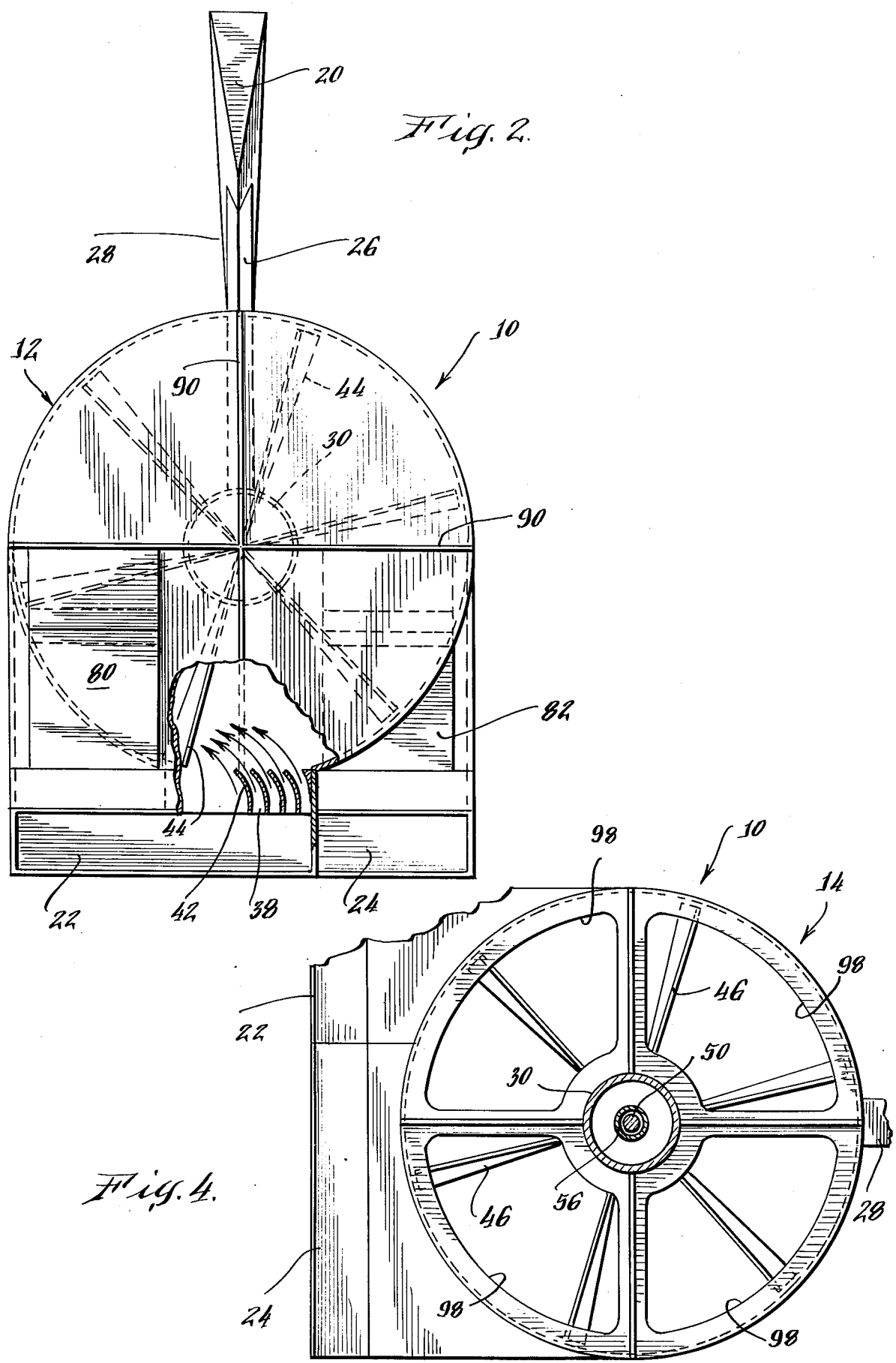

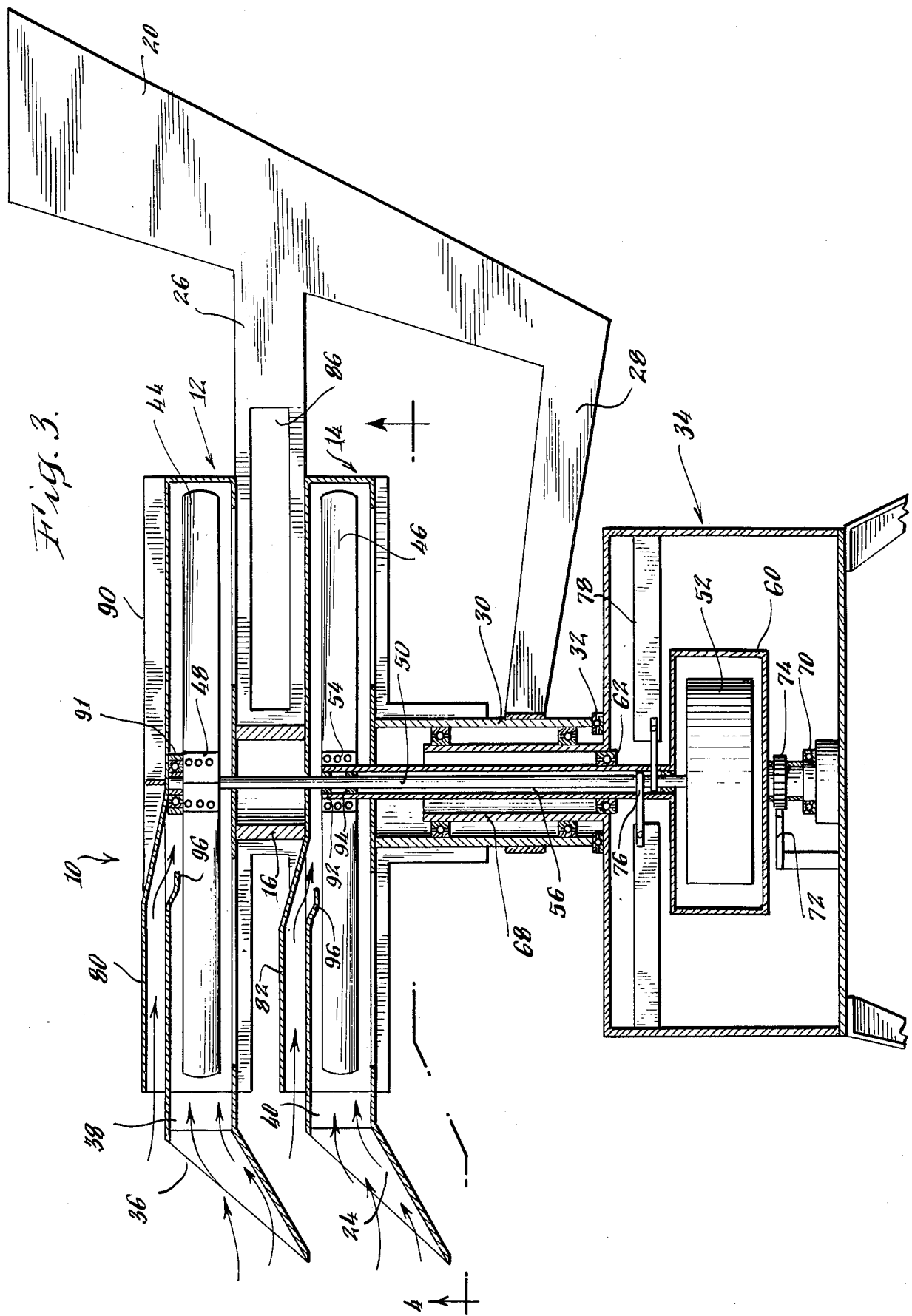

FLUID TURBINE

BACKGROUND OF THE INVENTION

1. Field of Invention

This invention relates to a fluid turbine structure which is used to generate electrical power by exposure to wind, tidal or ocean currents.

2. Description of Prior Art

With sources of energy, such as petroleum, natural gas and the like, being rapidly depleted throughout the world, either new sources of such energy must be found or alternative sources must be developed to fulfill the energy requirements for a highly technical society. Natural, nonpolluting, inexhaustable sources of energy, such as the wind, the tides, and the ocean currents can fulfill these needs.

U.S. Pat. Nos. 2,153,523 and 2,177,801 each illustrate the use of a wind driven double impeller for simultaneously rotating the field and armature windings of an electrical generator in opposite directions to double power production. The windings of the generator are connected to coaxial shafts which are driven in opposite or counterrotation by oppositely curved wind impellers. The impellers have opposite curvatures so as to turn in opposite directions when positioned normal to the direction of the wind by a vane.

Twin impeller wind machines have been able to provide more electrical power because of their inherent design. However, in the construction of twin impeller wind machines, one impeller has always been placed behind the other in parallel, vertical planes. Accordingly, both impellers must get their energy from the same wind field while rotating in opposite directions which is inefficient and causes undesirable centrifugal forces.

Furthermore, many attempts have been made to impart specific designs to the impellers so that they can spin in light as well as strong fluid currents. Such impellers have taken the form of exposed air foils, sails and paddles. However, many of these rotor structures are inefficient because as they rotate away from the fluid force, they also must return to their starting point and therefore, must cut back into the source of fluid, which tends to retard their rotation.

It will be appreciated from the above discussion that fluid powered turbines have mainly been machines placed in fluid currents to rotate from the direct force of that current as it moves past a rotor or impeller that is connected to an electrical generator. Little has been done in the way of molding, shaping, directing, or increasing the velocity of the fluid upon the rotor arrangement. In theory, the power available from a fluid current is proportional to the cube of the fluid current velocity. If the existing fluid velocity could be doubled, the power output would multiply by a factor of 8. An increase of 5 m.p.h. of the impinging fluid upon the rotor wherein the initial fluid velocity is in the range of 15 – 30 m.p.h., would result in doubling the power output. Therefore, the most powerful fluid driven machine would be one in which means are provided to increase the velocity of the arriving fluid and which is designed for maximum efficiency.

SUMMARY OF THE INVENTION

The fluid turbine of the present invention is characterized by increased power output and efficiency which is accomplished by providing upper and lower twin rotors which are spaced in parallel, horizontal planes so as to be subject to separate wind fields or fluid currents and, therefore, subject to independent operation. The rotor or impeller blades are not forced to cut back into the wind or fluid current as in prior art devices, but rather the vector force of the fluid impinging on the blades and the vector force imparted by new fluid entering the rotor are complimentary.

Two substantially annular, rotor housings are each provided with a plurality of radially extending blades connected to co-axial shafts. One of the shafts is connected to the field windings of an electrical generator, while the other shaft is connected to the armature windings. The radial blades in each rotor housing, when exposed to a fluid force are adapted to rotate in opposite or counter-directions causing the field and armature windings of the generator to rotate in opposite directions to increase the power output from the generator.

Properly curved stator blades adjacent to the entrance to each rotor housing form a series of fluid jets which provide acceleration to the oncoming fluid and a means for directing that fluid in a manner normal to the path of rotation of the rotor blades. This has the effect of increasing the starting torque on the radial rotor blades about the annular housing of each opposite rotating rotor and once operation is commenced, to increase the available effective force of the incoming fluid current.

Directing fluid to the stator blades are two fluid scoops at 45° angles to the housings. The scoops placed in this manner increase the velocity of the fluid entering the entrance to each housing and stator apertures and results in increasing the force delivered upon each blade on both rotors which increases the velocity of both rotors in opposite directions and thus multiplies the power output by an extremely significant amount.

As the accelerated fluid enters the stator apertures and pushes upon the blades, the fluid will try to travel at a quicker rate than the blades because of the internal resistance of the rotors. This causes the fluid to apply steady pressure upon each rotor blade as it travels around the inside of the housing.

A trail vane and "lazy susan" bearing provide means for keeping the machine pointed normal to or into the oncoming fluid. New fluid passing through the stator jets formed by the stator blades will tend to recycle this fluid, changing its direction and thus adding to the force of the fluid already in the rotor housing. This increases the rotor torque. The stator jets bend the fluid from its normal direction to a position aiding the internal fluid in applying pressure against the rotor blades making this internal fluid compatible with new fluid entering the housing to eliminate turbulence.

Tunnels can also be mounted on the top of each rotor housing to deliver fluid to the interior of the housing and create a low pressure area inside each housing to increase the velocity of the fluid within the housing and the pressure on the rotor blades.

By use of the arrangement described, power output is available even in light fluid currents or winds, and in heavy currents, power output is greatly multiplied.

Powerful wind electrical generators aesthetically acceptable for urban use are virtually non-existent. Flat, encased, horizontal rotor design is ideal for city rooftops in that it can easily blend with urban design without having ugly blades protruding into the sky.

Horizontal rotor design is also important for use in river base locations where major ports are situated.

Tidal forces changing the current of the rivers at these places could be utilized only if an electrical generating machine could be located close to the river bottom so as not to interfere with the passage of ships.

Further advantages of the invention will become more apparent in the following description and claims, and from the accompanying drawings, wherein:

BRIEF DESCRIPTION OF THE DRAWINGS

FIG. 2 is a top plan view of the fluid turbine shown in FIG. 1 with portions broken away and shown in section for purposes of illustration;

FIG. 3 is a longitudinal cross-section of the fluid turbine of FIG. 1; and

FIG. 4 is a cross-sectional view taken along the plane indicated by the line 4—4 of FIG. 3.

DETAILED DESCRIPTION OF THE PREFERRED EMBODIMENT

Figure 1:
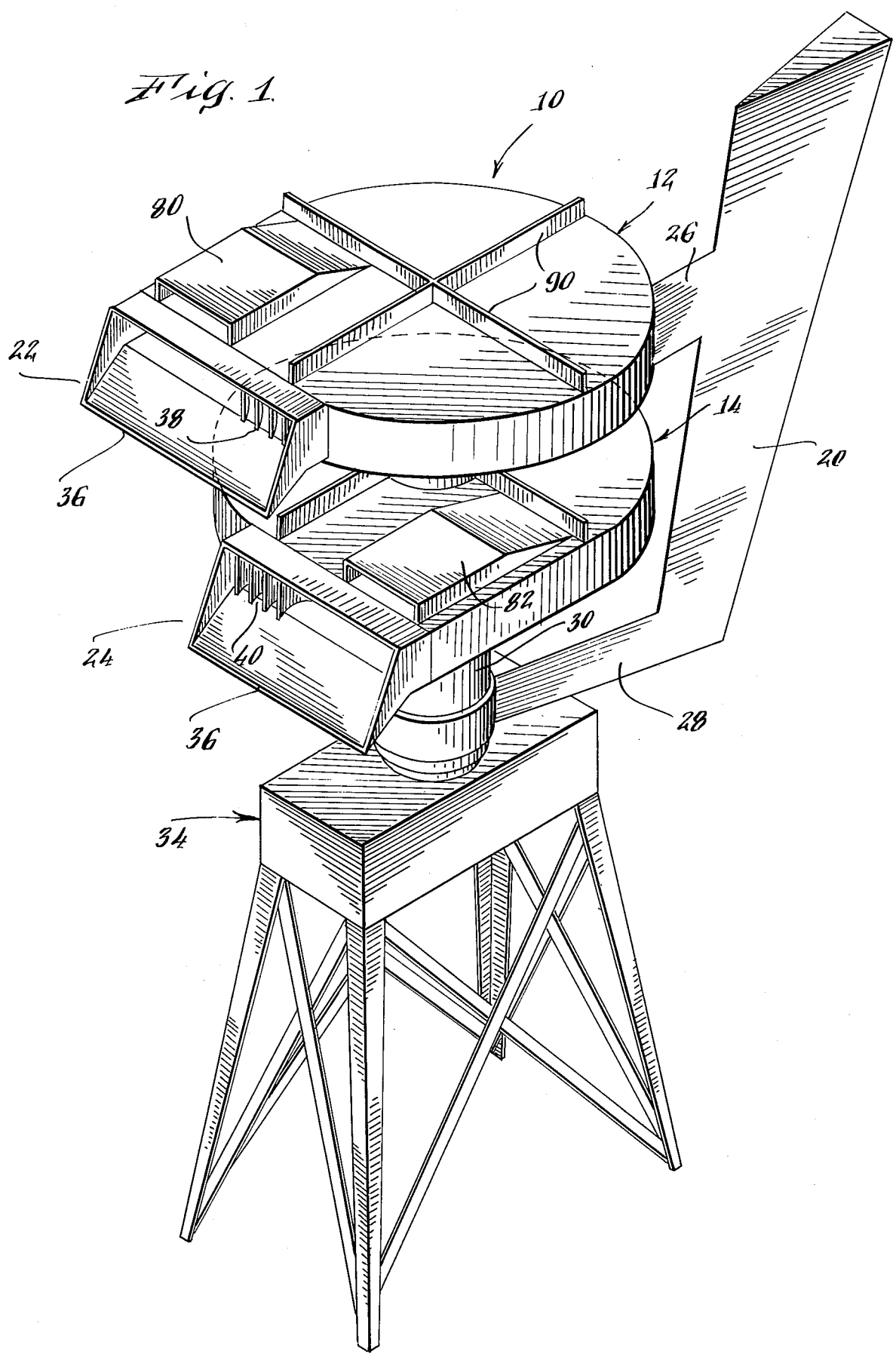
FIG. 1 is a perspective view of the fluid turbine comprising the subject matter of the present invention.

Referring now to the drawings in detail, wherein like numerals indicate like elements throughout the several views, the fluid turbine of the present invention is generally indicated by the numeral 10.

Fluid turbine 10 includes a substantially annular, horizontal, upper rotor housing 12 and a similar lower rotor housing 14. Rotor housings 12 and 14 are interconnected by a hollow shaft or sleeve 16 fixed to the bottom surface of upper rotor housing 12 and the upper surface of lower rotor housing 14. The bottom surface of lower rotor housing 14 is attached by any suitable means such as welding to a hollow shaft 30 and welded or otherwise fixed thereto. Hollow shaft 30 is seated on the upper portion of an annular roller bearing 32, whose lower portion is fixed to a planar surface of a support tower 34.

Upper rotor housing 12, sleeve 16, lower rotor housing 14, hollow shaft 30 and a vane 20 form a shell system to house the component parts of the fluid turbine 10 and are adapted to turn in unison as an integral unit into the wind or other fluid power source current. The entire shell structure can be constructed from lightweight aluminum or fiberglass.

The vane 20, which is generally triangular in cross-section, is adapted to position upper and lower rotor housings 12 and 14 so that their respective entrances 22 and 24 are normal to the direction of the fluid current flow. Vane 20 includes a pair of laterally extending arms 26 and 28. Arm 26 is rigidly attached to upper rotor housing 12, lower rotor housing 14 and sleeve 16. Arm 28 is rigidly attached to hollow shaft 30 by a welded ring or equivalent structure.

Wind or other fluid currents impinging upon vane 20 causes the vane 20 to turn. Through its arms 26 and 28 connected to rotatable sleeve 16 and rotatable hollow shaft 30, respectively, vane 20 will position the entrances 22 and 24 to the upper and lower rotor housings respectively, in a direction normal to the direction of the wind or fluid current.

Entrances 22 and 24 to the upper and lower rotor housings are defined by a scoop-shaped extension 36, which aids in increasing the velocity of the incoming fluid. Fixed between the top and bottom annular surfaces in the interior of the upper and lower rotor housings 12 and 14 adjacent their entrances are a plurality of stationary stator blades 38 and 40, respectively.

As shown more clearly in FIG. 2, the stator blades 38 are positioned adjacent to the opening into housing 12 and are located to one side of the center of the opening. The blades 38 are curved in the direction in which a plurality of radial rotor blades 44 are returning from their travel about housing 12. The stator blades 38 bend the incoming fluid so that it may strike rotor blade 44 positioned in line with the external directional flow of fluid, in a direction aiding the normal annular rotation of the rotor blades 44.

Positioned within each of rotor housings 12 and 14 are the plurality of radial, rotor blades 44 and 46, respectively. Six to eight blades 44 are provided in the upper rotor housing 12 and six to eight blades 46 are provided in the lower rotor housing 14. The blades are equally spaced apart and are curved away from the impinging fluid as illustrated in FIG. 2. Blades 44, when struck by the fluid issuing from between stator blades 38 will be rotated in a clockwise manner, while blades 46 in the lower rotor housing 14 will be rotated in a counterclockwise manner because of the opposite curvature of stator blades 40.

Upper rotor blades 44 are connected by flanges 48 to a central, vertical shaft 50 which, as illustrated in FIG. 3, extends downwardly through the upper rotor housing 12, sleeve 16, lower rotor housing 14, into the interior of tower 34 wherein it is attached to the armature windings, generally designated by the numeral 52, of an electrical generator. Blades 46 are similarly connected by flanges 54 to a shaft 56 which is coaxial with and telescopically receives the shaft 50, except shaft 56 terminates below the top of shaft 50. Shaft 56 is connected to a housing 60 containing the field windings of the electrical generator unit within tower 34.

Bearing 91 located between the roof of rotor housing 12 and the top of shaft 50 centers the shaft 50 and along with interaction bearings 92 and 94 between shafts 50 and 56 permits rotation of shaft 50 relative to rotor housings 12 and 14. Shaft 56, spaced from shaft 50 by bearings 92 and 94, is continued downwardly from generator housing 60 and is seated in a bearing block 70 and is adapted to rotate therein. A ratchet arm 72 in contact with a series of pawl teeth 74 precludes counter-rotation of shaft 56. Shaft 56 also includes commutator rings which are in contact with brushes 76 extending from supports 78 for transmission of the generated electricity.

To increase fluid velocity in each rotor housing, a fluid tunnel 80 is provided on the top surface of rotor housing 12 while a fluid tunnel 82 is provided on the top surface of rotor housing 14, on the side opposite from stator vanes 38 and 40, respectively. Fluid enters each tunnel, as shown by the arrows in FIG. 3. An angular wing 96 located in each of the housings creates a low pressure area and directs the fluid which has come into the housing from the normal opening and stator jets, and is adjacent the interior portion of the blades through openings 98, as shown in FIG. 4, in the floor of each housing. This wing 96 increases the velocity of the fluid entering the housing from each tunnel and directs that fluid onto the curved rotor blades 44 and 46 in an annular direction as the rotor blades pass the wing. Creation of the low pressure area adjacent wing 96 will also augment fluid flow entering the housings.

In operation, wind or an equivalent fluid current will impinge upon vane 20 causing rotor housings 12 and 14 to rotate together so that their entrances 22 and 24 are positioned normal to the direction of the wind or fluid current. Fluid will enter rotor housing 12 through its scoop 36 and tunnel 80. Scoop 36 concentrates the fluid entering into the interior of rotor housing 12 and fluid issuing from tunnel 80 into the interior of rotor housing 12 will tend to force more fluid into the housing, while augmenting the velocity of the fluid. Fluid entering scoop 36 between the stator blades 38 will issue therefrom in a plurality of jets in a clockwise direction to impinge upon blades 44 and will entrain the fluid entering through the other side of scoop 36 and tunnel 80 to add additional fluid pressure to impinge successively upon blades 44 causing their rotation in a clockwise direction, as viewed in FIG. 2. Fluid will also flow through scoop 36 of rotor housing 14 and tunnel 82 with a similar effect except that the direction of fluid impingement will be counterclockwise on curved blades 46, as viewed in FIG. 2, causing blades 46 to rotate opposite to the direction of rotation of blades 44. Rotation of blades 44 and 46 are independent as they have been located in independent fields of fluid current. Rotation of blades 44 will cause rotation of shaft 50 which in turn will cause rotation of the armature windings of the electrical generator. Rotation of blades 46 in a counter-direction will cause rotation of coaxial shaft 56 and housing 60 containing the field windings of the generator. The result is that the field and armature windings of the generator will turn in opposite directions, increasing the power output of the generator.

Since blades 44 and 46 are completely enclosed by their respective rotor housings, the blades will be pushed around by the fluid and any residual fluid force can be recycled in the housing with the incoming fluid flowing through scoops 36. Therefore, the fluid turbine 10 of this invention is operable in light winds, because the design of the rotor housings and the use of the stator jets, scoops and tunnels which are useful in increasing the fluid pressure and velocity on blades 44 and 46. Further, by enclosing the blades and by the provision of the stator jets, the blades do not cut back into the fluid current or wind, so that the only opposing forces to the rotors are the internal resistance in the bearings and the magnetic field of the generator.

Arm 26 should be provided with an opening 86 so that fluid escaping from the interior of top rotor housing 12 will not impinge upon the arm to reorient the rotor housings from its position normal to the direction of fluid flow. Cross braces such as indicated at 90 are provided on the upper and lower surface of each of the rotor housings for required support.

What is claimed is:

1. A fluid turbine for generating electrical power comprising:
    first rotor means including
    a first housing having a fluid entrance passage,
    a plurality of first rotor blades within said first housing, said rotor blades being adapted to rotate in one direction when exposed to a source of fluid,
    second rotor means including
    a second housing having a fluid entrance passage,
    a plurality of second rotor blades within said second housing, said rotor blades being adapted to rotate in the opposite direction when exposed to a source of fluid,
    means connected to said first and second rotor housings for independently rotating said housings coaxial to said first and second rotor blades in response to omni-directional fluid flow to position said fluid entrance passages in said first and second rotor housings normal to the direction of fluid flow, and
    electrical means operatively connected to said first and second rotor blades for generating electrical power in response to the opposite rotation of said first and second rotor blades,
    both of said first and second rotor housings including
    means adjacent said fluid entrance passage for increasing the velocity of the fluid flow to said rotor blades.

2. A fluid turbine in accordance with claim 1 wherein said last named means includes
    stator means for forming a plurality of fluid jets when exposed to a source of fluid.

3. A fluid turbine in accordance with claim 2 wherein said stator means recycles at least part of the fluid rotating said rotor blades.

4. A fluid turbine in accordance with claim 3 wherein said stator means changes the direction of the incoming fluid to guide the fluid in a direction aiding rotation.

5. A fluid turbine in accordance with claim 4 wherein said last named means further includes
    means for creating a low pressure area adjacent said entrance passage to force fluid from said source into said rotor housing.

6. A fluid turbine in accordance with claim 5 wherein said last named means includes
    scoop means for concentrating fluid entering said rotor housing from said fluid source.

7. A fluid turbine in accordance with claim 6 wherein each of said first and second rotor means includes
    a substantially annular housing
    a plurality of radially extending rotor blades in each of said housings sequentially rotatable past said entrance passage upon which the fluid entering said rotor housing will impinge, and
    shaft means connecting said rotor blades to said electrical generating means for transforming the mechanical rotation of said blades into electric power.

8. A fluid turbine in accordance with claim 7 wherein said shaft means includes
    a first shaft connected to the radial blades in said first rotor housing, and
    a second shaft connected to the radial blades in said second rotor housing,
    said first and second shafts being coaxial.

9. A fluid turbine in accordance with claim 8 wherein said first shaft is connected to the field windings of an electrical generator, and
    said second shaft is connected to the armature of an electrical generator,
    whereby opposite rotation of said shafts when said rotor means are exposed to said fluid source will cause said armature and field windings to rotate in opposite directions to generate electrical power.

10. A fluid turbine in accordance with claim 9 wherein
    said stator means includes
    a plurality of arcuately extending blades positioned in the entrance passage of each of said rotor housings directing entering fluid flow to impinge upon said rotor blades.

11. A fluid turbine in accordance with claim 10 including means defining a plurality of openings in one surface of each of said rotor housings.

12. A fluid turbine in accordance with claim 11 including locking means operatively connected to one of said shafts so as to preclude accidental rotation of said rotor blades in the same direction.

13. A fluid turbine in accordance with claim 12 wherein said rotor housings are disposed in parallel, horizontal planes.

14. A fluid turbine in accordance with claim 13 wherein said fluid source is the wind.

15. A fluid turbine in accordance with claim 13 wherein said fluid source is water.

16. A fluid turbine in accordance with claim 1 wherein each of said first and second rotor means includes
a substantially annular housing
a plurality of radially extending rotor blades in said housing sequentially rotatable past said entrance passage upon which the fluid entering said rotor housing will impinge, and
shaft means connecting said rotor blades to said electrical generating means for transforming the mechanical rotation of said blades into electric power.

17. A fluid turbine in accordance with claim 16 wherein said shaft means includes
a first shaft connected to the radial blades in said first rotor housing, and
a second shaft connected to the radial blades in said second rotor housing,
said first and second shafts being coaxial.

18. A fluid turbine in accordance with claim 17 wherein
said first shaft is connected to the field windings of an electrical generator, and
said second shaft is connected to the armature of an electrical generator,
whereby opposite rotation of said shafts when said rotor blades are exposed to said fluid source will cause said armature and field windings to rotate in opposite directions to generate electrical power.

19. A fluid turbine in accordance with claim 2 wherein said stator means includes
a plurality of arcuately extending blades positioned in the entrance passage of each of said rotor housings, directing entering fluid flow to impinge upon said rotor blades.

20. A fluid turbine in accordance with claim 1 including means defining a plurality of openings in a surface of each of said rotor housings.

21. A fluid turbine in accordance with claim 1 wherein said rotor means are disposed in parallel, horizontal planes.

22. A fluid turbine in accordance with claim 1 wherein said fluid source is the wind.

23. A fluid turbine in accordance with claim 1 wherein each of said first and second rotor means includes
a substantially annular housing for guiding fluid flow in a substantially annular direction, and
a plurality of radially extending rotor blades in each of said housings sequentially rotatable past said entrance passage upon which the fluid entering said rotor housing will impinge.

24. A fluid turbine in accordance with claim 1 wherein said means for positioning said first and second rotor housings normal to the direction of fluid flow includes
a vane having a substantially triangular cross-section fixed to said first and second rotor housings.

25. A fluid turbine in accordance with claim 13 wherein said means for positioning said first and second rotor housings normal to the direction of fluid flow includes
a vane having a substantially triangular cross-section fixed to said first and second rotor housings.

26. A fluid turbine for generating electrical power comprising:
first rotor means including
a first housing having a fluid entrance passage,
a plurality of first rotor blades within said first housing, said rotor blades being adapted to rotate in one direction when exposed to a source of fluid,
second rotor means including
a second housing having a fluid entrance passage,
a plurality of second rotor blades within said second housing, said rotor blades being adapted to rotate in the opposite direction when exposed to a source of fluid,
means connected to said first and second rotor housings for independently rotating said housings coaxial to said first and second rotor blades in response to omni-directional fluid flow to position said fluid entrance passages in said first and second rotor housings normal to the direction of fluid flow, and
electrical means operatively connected to said first and second rotor blades for generating electrical power in response to the opposite rotation of said first and second rotor blades,
both of said first and second rotor housings including
a plurality of arcuately extending blades positioned in the entrance passage of each of said rotor housings for directing entering fluid flow to impinge upon said rotor blades.

27. A fluid turbine for generating electrical power comprising:
first rotor means adapted to rotate in one direction when exposed to a source of fluid,
second rotor means adapted to rotate in the opposite direction when exposed to the same source of fluid,
electrical means operatively connected to said first and second rotor means for generating electrical power in response to the opposite rotation of said first and second rotor means,
said first and second rotor means including
an annular housing having a fluid entrance passage,
a plurality of radially extending blades in said housing sequentially rotatable past said entrance passage upon which the fluid entering said rotor housing will impinge,
means connected to said rotor housing for independently rotating said housing coaxial to said rotor blades in response to omni-directional fluid flow to position said fluid entrance passage in said rotor housing normal to the direction of fluid flow,
shaft means connecting said rotor blades in each annular housing to said electrical generating means for transforming mechanical rotation of said vanes into electrical power, said shaft means including
a first shaft connected to said radial blades in said first rotor housing
a second shaft connected to the radial blades in said second rotor housing,
said first and second shafts being coaxial, and
said housings of said rotor means being disposed in parallel, horizontal planes.

28. A fluid turbine for generating electrical power comprising rotor means including
an annular housing for directing fluid flow in a substantially annular direction, said housing including
a fluid entrance passage, and
a plurality of rotor blades within said housing adapted to rotate when exposed to a source of fluid,
means connected to said rotor housing for independently rotating said housing coaxial to said rotor blades in response to omni-directional fluid flow to position said fluid entrance passage in said rotor housing normal to the direction of fluid flow, and
electrical means operatively connected to said rotor blades for generating electrical power in response to the rotation of said rotor blades,
said rotor housing including
means adjacent said entrance passage for increasing the velocity of fluid flow to said rotor housing.

29. A fluid turbine in accordance with claim 28 wherein said last named means includes
stator means for forming a plurality of fluid jets when exposed to a source of fluid.

30. A fluid turbine in accordance with claim 29 wherein said stator means recycles at least part of the fluid rotating said rotor blades.

31. A fluid turbine in accordance with claim 29 wherein said stator means changes the direction of the incoming fluid to guide the fluid in a direction aiding rotation.

32. A fluid turbine in accordance with claim 28 wherein said last named means includes
means for creating a low pressure area adjacent said entrance passage to force fluid from said source into said rotor housing.

33. A fluid turbine in accordance with claim 28 wherein said last named means includes
scoop means for concentrating fluid entering said rotor housing from said fluid source.

34. A fluid turbine for generating power comprising rotor means including
a housing for directing fluid flow in a substantially angular direction, said housing including
a fluid entrance passage, and
a plurality of rotor blades within said housing adapted to rotate when exposed to a source of fluid,
means connected to said rotor housing for independently rotating said housing coaxial to said rotor blades in response to omni-directional fluid flow to position said fluid entrance passage in said rotor housing normal to the direction of fluid flow, and
means operatively connected to said rotor blades for generating power in response to the rotation of said rotor blades.

35. A fluid turbine in accordance with claim 34 including
stator means on said housing for forming a plurality of fluid jets when exposed to a source of fluid.

36. A fluid turbine in accordance with claim 35 wherein said stator means recycles at least part of the fluid rotating said rotor blades.

37. A fluid turbine in accordance with claim 36 wherein said stator means changes the direction of the incoming fluid to guide the fluid in a direction aiding rotation.

38. A fluid turbine in accordance with claim 34 including
means for creating a low pressure area adjacent said entrance passage to force fluid from said source into said rotor housing.

39. A fluid turbine in accordance with claim 34 including
scoop means for concentrating fluid entering said rotor housing from said fluid source.

40. A fluid turbine in accordance with claim 35 wherein
said stator means includes
a plurality of arcuately extending blades positioned in the entrance passage of said rotor housing directing entering fluid flow to impinge upon said rotor blades.

41. A fluid turbine in accordance with claim 34 including means defining a plurality of openings in one surface of said rotor housing.

42. A fluid turbine in accordance with claim 34 wherein said rotor means includes
a substantially annular housing
a plurality of radially extending rotor blades in said housing sequentially rotatable past said entrance passage upon which the fluid entering said rotor housing will impinge, and
shaft means connecting said rotor blades to said generating means for transforming the mechanical rotation of said blades into electric power.

43. A fluid turbine in accordance with claim 34 wherein said means for rotating said housing coaxial to said rotor blades includes
a vane having a substantially triangular cross-section fixed to said housing.

44. A fluid turbine in accordance with claim 34 including
scoop means for concentrating fluid entering said rotor housing from said fluid source.

45. A fluid turbine for generating power comprising rotor means including
a housing including
a fluid entrance passage, and
a plurality of rotor blades within said housing adapted to rotate about a longitudinal axis when exposed to a source of fluid,
means operatively connected to said rotor blades for generating power in response to the rotation of said rotor blades, and
means adjacent said entrance passage extending substantially perpendicular to the rotational axis of said rotor blades for creating a low pressure area to force fluid from said source into said rotor housing past said rotor blades.

* * * * *